United States Patent
Song et al.

(10) Patent No.: US 9,307,436 B2
(45) Date of Patent: Apr. 5, 2016

(54) METHOD AND USER EQUIPMENT FOR USER EQUIPMENT TO REPORT A MEASUREMENT RESULT

(71) Applicant: Huawei Technologies Co., LTD., Shenzhen (CN)

(72) Inventors: Weiwei Song, Shenzhen (CN); Wei Quan, Shenzhen (CN); Yuhua Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/305,552

(22) Filed: Jun. 16, 2014

(65) Prior Publication Data

US 2014/0295770 A1 Oct. 2, 2014

Related U.S. Application Data

(63) Continuation of application No. PCT/CN2012/086236, filed on Dec. 8, 2012.

(30) Foreign Application Priority Data

Dec. 15, 2011 (CN) .......................... 2011 1 0420326

(51) Int. Cl.
*H04B 17/00* (2015.01)
*H04W 24/10* (2009.01)
*H04W 36/00* (2009.01)

(52) U.S. Cl.
CPC .......... *H04W 24/10* (2013.01); *H04W 36/0088* (2013.01)

(58) Field of Classification Search
CPC . H04W 24/10; H04W 36/32; H04W 36/0088; H04W 84/045; H04W 64/00; H04W 24/08; H04W 36/0083; H04W 36/04; H04W 88/08; H04W 24/02; H04W 36/30; H04W 48/16; H04W 48/20
USPC ....................................................... 455/67.11
See application file for complete search history.

(56) References Cited

U.S. PATENT DOCUMENTS

2012/0108252 A1* 5/2012 Dimou .................. H04W 36/32
455/450

* cited by examiner

*Primary Examiner* — Ajibola Akinyemi
(74) *Attorney, Agent, or Firm* — Brinks Gilson & Lione (57) ABSTRACT

Embodiments of the present disclosure provide a method for a UE to report a measurement result and the UE, which may timely and accurately report the measurement result to a base station and improve the communication continuity of the UE. The method for UE to report a measurement result includes: determining a moving speed state of the UE, and determining a measurement parameter according to the moving speed state; acquiring a measurement period of the UE according to the determined measurement parameter; and in the measurement period, measuring a cell to obtain a measurement result, and reporting the measurement result to a serving base station of the UE. The present disclosure is suitable for UE to report a measurement result.

11 Claims, 4 Drawing Sheets

METHOD AND USER EQUIPMENT FOR USER EQUIPMENT TO REPORT A MEASUREMENT RESULT

CROSS-REFERENCE TO RELATED APPLICATIONS

This application is a continuation of International Application No. PCT/CN2012/086236, filed on Dec. 8, 2012, which claims priority to Chinese Patent Application No. 201110420326.6, filed on Dec. 15, 2011, both of which are hereby incorporated by reference in their entireties.

TECHNICAL FIELD

The present disclosure relates to a mobile communication system, and particularly, to method and user equipment for user equipment (UE) to report a measurement result.

BACKGROUND

A UE of an LTE (Long Term Evolution, long term evolution) mobile communication system has two basic operation modes after being started: an idle mode and a connected mode.

Wherein, when the UE is in the connected mode, for saving power of the UE, an RRC (Radio Resource Control, radio resource control) layer of the UE will configure a DRX (Discontinuous Reception, discontinuous reception) cycle. In this way, the UE wakes up to monitor information of a PDCCH (Physical Downlink Control Channel, physical downlink control channel) in each DRX cycle, and the UE enters a sleep state after monitoring is ended.

The UE monitors a signal of a cell in each DRX cycle and measures the availability of radio resources of intra-frequency, inter-frequency and inter-system of the cell, such as received signal intensity, power and the like, the UE report a measurement result to a base station within a measurement period, and the base station determines whether the UE needs to perform cell switching and which cell the UE needs to be switched to according to the measurement result.

In the aforementioned process of monitoring and measurements of intra-frequency, inter-frequency and inter-system in the connected mode of the UE, since the period that the UE reports the measurement result is determined by the DRX cycle, for the UE in a moving speed rate, the problem that the measurement result is not reported in time may be caused, thus affecting the communication continuity of the UE.

SUMMARY

Embodiments of the present disclosure provide a method and a user equipment for user equipment (UE) to report a measurement result, so that the UE reports the measurement result accurately and timely, which makes the network switching performance of the UE is improved.

In order to fulfill the aforementioned objectives, the embodiments of the present disclosure adopt the following solutions:

a method for a UE to report a measurement result, including:

determining a moving speed state of the UE, and determining a measurement parameter according to the moving speed state;

acquiring a measurement period of the UE according to the determined measurement parameter;

measuring a cell to obtain a measurement result in the measurement period and reporting the measurement result to a serving base station of the UE.

A user equipment (UE) may be a device used by a user such as a phone, a smart phone, a computing device, or any device including a processor and a non-transitory storage medium accessible to the processor. The UE may include the following units stored in the non-transitory storage medium:

a determining unit, configured to determine a moving speed state of the UE, and to determine a measurement parameter according to the moving speed state;

an acquiring unit, configured to acquire a measurement period of the UE according to the measurement parameter determined by the determining unit;

a processing unit, configured to measure a cell to obtain a measurement result in the measurement period of the UE acquired by the acquiring unit and to report the measurement result to a serving base station of the UE.

The method for UE to report a measurement result and the UE for reporting a measurement result provided in the embodiments of the present disclosure, according to a judgment of a moving speed state of a UE and preset measurement parameters in accordance with different moving speed states, a measurement period of the UE is obtained. Then the UE accurately and timely report a measurement result of a neighboring cell to the base station within the measurement period. In this way, the measurement period of the UE is acquired according to the measurement parameter corresponding to the moving speed state of the UE. Therefore the measurement result may be timely, accurately reported to the base station when the UE is in the high moving speed state, so that communication continuity of the UE is improved.

BRIEF DESCRIPTION OF DRAWINGS

In order to illustrate the solution in the embodiments of the present disclosure or the prior art more clearly, brief description will be made below to the drawings required in the embodiments of the present disclosure or the prior art, and apparently, the drawings described below are some embodiments of the present disclosure only, and other drawings could be obtained based on these drawings by those ordinary skilled in this art without creative efforts.

DESCRIPTION OF EMBODIMENTS

The solutions in the embodiments of the present disclosure are hereinafter described in detail and completely, with reference to accompanying drawings in the embodiments of the present disclosure. Apparently, the described embodiments are only a part, but not all, of the embodiments of the present disclosure. All of the other embodiments that are obtained by those skilled in the art based on the embodiments in the disclosure without any inventive efforts fall into the scope protected by the present disclosure.

Embodiment 1

Figure 1:
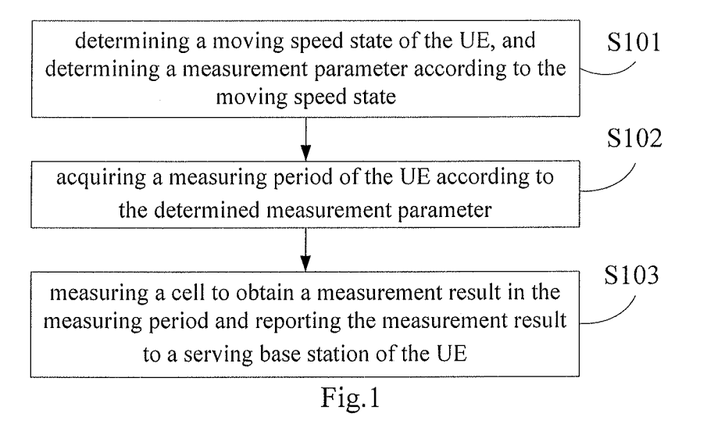
FIG. 1 is a flowchart of a method for UE to report a measurement result provided in embodiment 1 of the present disclosure.

An embodiment of the present disclosure provides a method for UE to report a measurement result. As shown in FIG. 1, the embodiment of the present disclosure specifically includes:

S101, determining a moving speed state of the UE, and determining a measurement parameter according to the moving speed state.

The UE may determine the moving speed state of the UE according to the number of switched or residing cells within a period. For example, the UE may acquire its own moving speed state according to the number of switched cells within a period. When the UE moves in an urban environment, coverage of a cell is relatively small, and distribution of base stations is relatively dense. If the number of the switched cells of the UE every 10 minutes is not less than 5, the moving speed state of the UE is a high moving speed state. If the number of the switched cells of the UE every 10 minutes is not less than 3, the moving speed state of the UE is a medium moving speed state. If the number of the switched cells of the UE every 10 minutes is less than 3, the moving speed state of the UE is considered as a normal moving speed state. When the UE moves in a suburban environment, coverage of a cell is relatively large, and distribution of base stations is relatively sparse. If the number of the switched cells of the UE every 10 minutes is 2, the moving speed state of the UE is a high moving speed state. If the number of the switched cells of the UE every 10 minutes is 1, the moving speed state of the UE is a medium moving speed state. If the number of the switched cells of the UE every 10 minutes is not more than 1, the moving speed state of the UE is a normal moving speed state.

Certainly, the UE may determine its own moving speed state by adopting other methods, and then define a specific high moving speed state, medium moving speed state and normal moving speed state by adopting the corresponding method, which is not specifically limited in the present disclosure.

Correspondingly, if the moving speed state is the high moving speed state, the determined measurement parameter is a high moving speed state measurement parameter; if the moving speed state is the medium moving speed state, the determined measurement parameter is a medium moving speed state measurement parameter; and if the moving speed state is the normal moving speed state, the determined measurement parameter is a normal moving speed state measurement parameter.

The measurement parameter may be determined from a measurement parameter set sent by a base station according to the moving speed state of the UE; or be determined from a pre-configured measurement parameter set in the UE according to the moving speed state of the UE, and the measurement parameter set includes measurement parameters of different moving speed states.

S102, acquiring a measurement period of the UE according to the determined measurement parameter.

Wherein, different moving speeds correspond to different measurement parameter values. The measurement parameter specifically may be a time parameter or a parameter related to speed. Then the measurement period of the UE is acquired according to the time parameter or the parameter related to the speed determined by the moving speed state of the UE.

S103, measuring a cell to obtain a measurement result in the measurement period and reporting the measurement result to a serving base station of the UE.

In the measurement period, the UE measures the cell to obtain the measurement result, and then reports the measurement result to the base station, so that the base station determines whether the UE needs to perform cell switching and which cell the UE needs to be switched to according to the contents of the measurement result.

Certainly, when the UE measures the cell, the UE may measure a serving cell of the UE or simultaneously measure a serving cell and a neighboring cell of the UE.

Wherein, a measurement of the cell performed by the UE includes an intra-frequency measurement, an inter-frequency measurement and an inter-system measurement.

Figure 2:
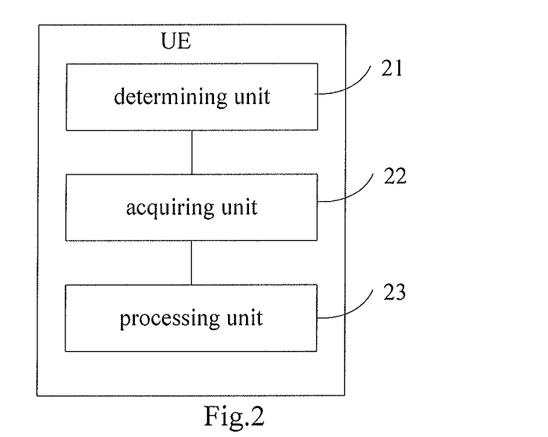
FIG. 2 is a composition block diagram of UE provided in embodiment 1 of the present disclosure.

An embodiment of the present disclosure also provides a UE, As shown in FIG. 2, the UE includes: a determining unit 21, an acquiring unit 22 and a processing unit 23.

The determining unit 21 is configured to determine a moving speed state of the UE and to determine a measurement parameter according to the moving speed state.

The determining unit 21 of the UE may determine the moving speed state of the UE according to the number of switched or residing cells within a period. For example, the determining unit 21 may acquire its own moving speed state according to the number of switched cells within a period. When the UE moves in an urban environment, coverage of a cell is relatively small, and distribution of base stations is relatively dense. If the number of the switched cells of the UE every 10 minutes is not less than 5, the moving speed state of the UE is a high moving speed state. If the number of the switched cells of the UE every 10 minutes is not less than 3, the moving speed state of the UE is a medium moving speed state. If the number of the switched cells of the UE every 10 minutes is less than 3, the moving speed state of the UE is a normal moving speed state. When the UE moves in a suburban environment, coverage of a cell is relatively large, and distribution of base stations is relatively sparse. If the number of the switched cells of the UE every 10 minutes is 2, the moving speed state of the UE is a high moving speed state. If the number of the switched cells of the UE every 10 minutes is 1, the moving speed state of the UE is a medium moving speed state. If the number of the switched cells of the UE every 10 minutes is not more than 1, the moving speed state of the UE is a normal moving speed state.

Certainly, the determining unit 21 of the UE may determine its own moving speed state by adopting other methods and then define a specific high moving speed state, medium moving speed state and normal moving speed state by adopting the corresponding method, which is not specifically limited in the present disclosure.

Correspondingly, if the moving speed state is the high moving speed state, the measurement parameter determined by the determining unit 21 of the UE is a high moving speed state measurement parameter; if the moving speed state is the medium moving speed state, the measurement parameter determined by the determining unit 21 of the UE is a medium moving speed state measurement parameter; and if the moving speed state is the normal moving speed state, the measurement parameter determined by the determining unit 21 of the UE is a normal moving speed state measurement parameter.

Wherein, different moving speeds correspond to different measurement parameter values. The measurement parameters specifically may be a time parameter or a parameter related to speed.

The determining unit 21 may determine the measurement parameter from a measurement parameter set sent by a base station according to the moving speed state of the UE, or from a pre-configured measurement parameter set in the UE according to the moving speed state of the UE, and the measurement parameter set includes measurement parameters of different moving speed states.

The acquiring unit 22 is configured to acquire a measurement period of the UE according to the measurement parameter determined by the determining unit 21.

The processing unit 23 is configured to measure a cell to obtain a measurement result in the measurement period of the UE acquired by the acquiring unit 22 and to report the measurement result to a serving base station of the UE.

In the measurement period, the processing unit 23 of the UE measures the cell to obtain the measurement result, and then a physical layer of the UE reports the measurement result to a high-level RRC layer of the UE. The high-level RRC layer of the UE accurately and timely reports a measurement result satisfying a report criterion to the base station, so that the base station determines whether the UE needs to perform cell switching and which cell the UE needs to be switched to according to the contents of the measurement result.

Certainly, when the UE measures the cell, the UE may measure a serving cell of the UE or simultaneously measure a serving cell and a neighboring cell of the UE.

Embodiments of the present disclosure provide a method and a user equipment for UE to report a measurement result. The UE acquires the measurement parameters corresponding to different moving speed states. According to a judgment of a moving speed state of a UE, the UE acquires the measurement period of the UE. Then the physical layer of the UE reports the measurement result to the high-level RRC layer of the UE in the reported measurement period. The high-level RRC layer of the UE accurately and timely reports the measurement result satisfying a report criterion, to the base station. In this way, the measurement period of the UE is acquired according to the measurement parameter corresponding to the moving speed state of the UE. Therefore the measurement result may be timely, accurately reported to the base station when the UE is in the high moving speed state, so that communication continuity of the UE is improved.

Embodiment 2

Figure 3:
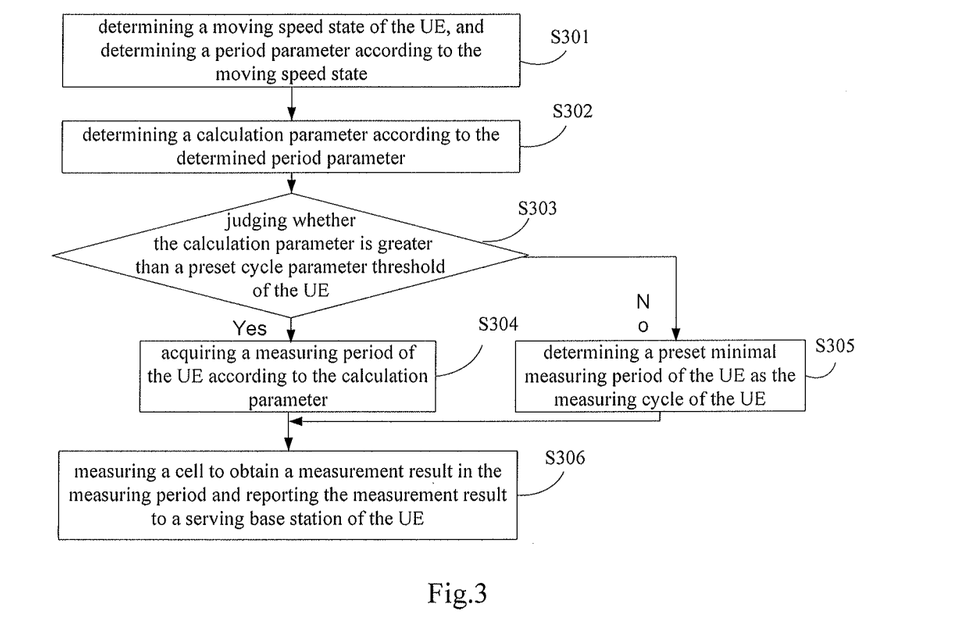
FIG. 3 is a flowchart of a method for UE to report a measurement result provided in embodiment 2 of the present disclosure.

An embodiment of the present disclosure provides a method for UE to report a measurement result. The method below is described by taking a UE of an LTE system as an example, wherein the measurement parameter is specifically a period parameter. Specifically, as shown in FIG. 3, the method includes:

S301, determining a moving speed state of the UE, and determining a period parameter according to the moving speed state.

The UE may determine the moving speed state of the UE according to the number of switched or residing cells within a period. For example, the UE may acquire its own moving speed state according to the number of switched cells within a period. When the UE moves in an urban environment, coverage of a cell is relatively small, and distribution of base stations is relatively dense. If the number of the switched cells of the UE every 10 minutes is not less than 5, and the moving speed state of the UE is a high moving speed state. If the number of the switched cells of the UE every 10 minutes is not less than 3, the moving speed state of the UE is a medium moving speed state. If the number of the switched cells of the UE every 10 minutes is less than 3, the moving speed state of the UE is considered as a normal moving speed state. When the UE moves in a suburban environment, coverage of a cell is relatively large, and distribution of base stations is relatively sparse. If the number of switched cells of the UE every 10 minutes is 2, and the moving speed state of the UE is a high moving speed state. If the number of the switched cells of the UE every 10 minutes is 1, the moving speed state of the UE is a medium moving speed state. If the number of the switched cells of the UE every 10 minutes is not more than 1, the moving speed state of the UE is a normal moving speed state.

Certainly, the UE may determine its own moving speed state by adopting other methods, and then define a specific high moving speed state, medium moving speed state and normal moving speed state by adopting the corresponding method, which is not specifically limited in the present disclosure.

Correspondingly, if the moving speed state is the high moving speed state, the determined measurement parameter is a high moving speed state measurement parameter; if the moving speed state is the medium moving speed state, the determined measurement parameter is a medium moving speed state measurement parameter; and if the moving speed state is the normal moving speed state, the determined measurement parameter is a normal moving speed state measurement parameter.

In this embodiment, the UE may merely determine that the moving speed state of the UE is the high moving speed state or the normal moving speed state, and certainly the UE may also determine the high moving speed state, the medium moving speed state and the normal moving speed state.

Wherein, the period parameter may be configured by a base station and then sent to the UE through a dedicated signaling and/or a system broadcast message, and certainly the period parameter may also be pre-configured in the UE. A specific process includes: the UE receives a period parameter set sent from the base station or a period parameter set is pre-configured in the UE, wherein the period parameter set includes period parameters of different moving speed states; and then the UE determines the period parameter from the period parameter set according to the moving speed state of the UE.

S302, determining a calculation parameter according to the determined period parameter.

Specifically, the period parameter determined according to the moving speed state is determined as the calculation parameter.

Or, the lower value of the period parameter and a pre-configured DRX cycle of the UE is acquired, and the lower value is determined as the calculation parameter.

According to the moving speed state of the UE, the period parameter may be a high moving speed state period parameter, a medium moving speed state period parameter or a normal moving speed state period parameter.

S303, determining whether the calculation parameter is greater than a preset period parameter threshold of the UE.

Period parameter threshold of intra-frequency, inter-frequency and inter-system are configured in the UE respectively, and the UE needs to determine the magnitudes of the calculation parameter and the period parameter thresholds corresponding to the intra-frequency, the inter-frequency and the inter-system respectively to determine respective measurement periods.

If the calculation parameter is greater than the period parameter threshold, S304 is executed; and if the calculation parameter is not greater than the period parameter threshold, S305 is executed.

S304, acquiring a measurement period of the UE according to the calculation parameter.

Wherein, a measurement of the cell performed by the UE includes an intra-frequency measurement, an inter-frequency measurement and an inter-system measurement.

For acquiring an intra-frequency measurement period, specifically, a threshold of an intra-frequency measurement period parameter may be pre-configured as 0.04 s. If the calculation parameter is greater than the threshold of the intra-frequency measurement period parameter, the intra-frequency measurement period of the UE is the product of a first natural number N1 and the calculation parameter, wherein the N1 is a preset natural number sent from a base station to the UE according to the high moving speed state through a dedicated signaling and/or a system broadcast message, and certainly the N1 may also be pre-configured in the UE, specifically as shown in table 1.

| Calculation Parameter (s) | Intra-frequency Measurement Period (s) |
|---|---|
| ≤0.04 | intra-frequency minimal measurement period |
| 0.04 < calculation parameter ≤ 2.56 | N1 * calculation parameter |

For an inter-frequency measurement period, specifically, a threshold of an inter-frequency measurement period parameter may be pre-configured as 0.08 s. If the calculation parameter is greater than the threshold of the inter-frequency measurement period parameter, the inter-frequency cell measurement period of the UE is the product of a second natural number N2, the number of inter-frequency layers $N_{freq}$ and the calculation parameter, wherein the N2 is a natural number preset by the base station according to different moving speed states and then sent to the UE through a dedicated signaling and/or a system broadcast message, and certainly the N2 may also be pre-configured in the UE; and the $N_{freq}$ is the number of the inter-frequency layers which need to be measured and are acquired by the UE through a system broadcast message and/or a dedicated signaling received from the base station, and the number of the inter-frequency layers $N_{freq}$ is the sum of the number of the frequency layers of the inter-frequency of the common-system and the number of the inter-system frequency layers of the UE. For this embodiment, the number of the inter-frequency layers indicates the sum of the number of the frequency layers of the inter-frequency of the LTE system and the number of the frequency layers of the non-LTE system, specifically as shown in table 2.

| Calculation Parameter (s) | Inter-Frequency Measurement Period (s) |
|---|---|
| ≤0.08 | inter-frequency minimal measurement period |
| 0.08 < calculation parameter ≤ 2.56 | N2 * $N_{freq}$ * calculation parameter |

For an inter-system measurement period, specifically, a threshold of the inter-system measurement period may be pre-configured as 0.128 s. If the calculation parameter is greater than the threshold of the inter-system measurement period, the inter-system measurement period of the UE is the product of a third natural number N3, the number of inter-frequency layers $N_{freq}$ and the calculation parameter, wherein the N3 is a natural number preset by the base station according to different moving speed states and then sent to the UE through a dedicated signaling and/or a system broadcast message, and certainly the N3 may also be pre-configured in the UE; and the $N_{freq}$ is the number of the inter-frequency layers which need to be measured and are acquired by the UE through a system broadcast message and/or a dedicated signaling received from the base station. The number of the inter-frequency layers $N_{freq}$ is the sum of the number of the frequency layers of the inter-frequency of the common-system and the number of the inter-system frequency layers of the UE. For this embodiment, the inter-frequency layers may indicate the sum of the number of the frequency layers of the inter-frequency of the LTE system and the number of the frequency layers of the non-LTE system. For the UE using the LTE system, when an interval that the UE receives inter-system information, which is configured by the base station, is 40 ms or 80 ms, the measurement period of the inter-system corresponding to different calculation parameters corresponds to different values.

| Calculation Parameter (s) | Inter-System Measurement Period (s) | |
|---|---|---|
| | Interval = 40 ms | Interval = 80 ms |
| ≤0.04 | inter-system minimal measurement period | inter-system minimal measurement period |
| 0.064 | 0.48 * $N_{freq}$ * calculation parameter | 0.8 * $N_{freq}$ * calculation parameter |
| 0.08 | 0.48 * $N_{freq}$ * calculation parameter | 0.8 * $N_{freq}$ * calculation parameter |
| 0.128 | 0.64 * $N_{freq}$ * calculation parameter | 0.8 * $N_{freq}$ * calculation parameter |
| 0.128 < calculation parameter ≤ 2.56 | N3 * $N_{freq}$ * calculation parameter | N3 * $N_{freq}$ * calculation parameter |

S305, determining a preset minimal measurement period of the UE as the measurement period of the UE.

Correspondingly, as mentioned in table 1, table 2 and table 3, if the calculation parameter is not greater than the threshold of the intra-frequency measurement period, the intra-frequency measurement period is the preset intra-frequencyintra-frequency minimal measurement period of the system, and specifically may be 200 ms; the inter-frequency cell measurement period is the preset inter-frequency minimal measurement period of the system, and specifically may be the product of 0.48 and the number of the inter-frequency layers $N_{freq}$ or the product of 0.24 and the number of the inter-frequency layers $N_{freq}$; and the inter-system measurement period is determined according to the preset value of the system, for example, when the calculation parameter is not more than 0.04, if the measurement interval is not needed, the inter-system measurement period is 0.48 s, if the measurement interval is needed, the inter-system measurement period is the minimal measurement period of the inter-system. Specifically, for example, when a UTRAN (UMTS Terrestrial Radio Access Network, UMTS terrestrial radio access network) frequency point is measured and the measurement interval is not needed, the inter-system measurement period is 0.48 s; when the measurement interval is used, the inter-system measurement period is $$T_{measurement\_UTRA\_FDD} = \text{Max}\left\{T_{Measurement\_Peruod\_UTRA\_FDD},\right.$$

$$\left. T_{basic\_measurement\_UTRA\_FDD} * \frac{480}{T_{inter1}} * N_{Freq}\right\}\text{ms},$$

wherein, $T_{Measurement\_Peruod\_UTRA\_FDD}$ is the inter-system minimal measurement period 0.48 s when the measurement interval is not needed, $T_{basic\_measurement\_UTRA\_FDD}$ is the longest time for the UE to identify one UTRAN cell, and $T_{inter1}$ is the least time for measuring the inter-frequency or the inter-system within the period of 0.48 s, the inter-frequency layers $N_{Freq}$ is the sum of the number of the inter-frequency frequency layers of the UE and the number of the frequency layers of the inter-system of the UE.

S306, measuring a cell to obtain a measurement result in the measurement period and reporting the measurement result to a serving base station of the UE.

According to the acquired intra-frequency measurement period, inter-frequency measurement period and inter-system measurement period, in the corresponding measurement period, respectively, the UE measures the cell to obtain the measurement result and reports the corresponding measurement result to an RRC layer of the UE, and the RRC layer of the UE accurately and timely reports a measurement result satisfying a report criterion, to the base station.

Certainly, when the UE measures the cell, the UE may measure a serving cell of the UE or simultaneously measure a serving cell and a neighboring cell of the UE.

The LTE system is taken as an example for illustration in this embodiment. Certainly, this method is also applicable for other communication systems, such as TDSCDM, CDMA and the like. However, the specific period parameter thresholds and DRX cycles are configured to be different for different communication systems. The specific process will not be repeated redundantly herein.

According to the method for UE to report a measurement result provided in the embodiment of the present disclosure, the period parameter corresponding to the moving speed state of the UE is preset, and the measurement period of the UE is acquired according to the period parameter, so that the measurement result may be timely and accurately reported when the UE is in the high speed state, and the communication continuity of the UE is improved.

Embodiment 3

Figure 4:
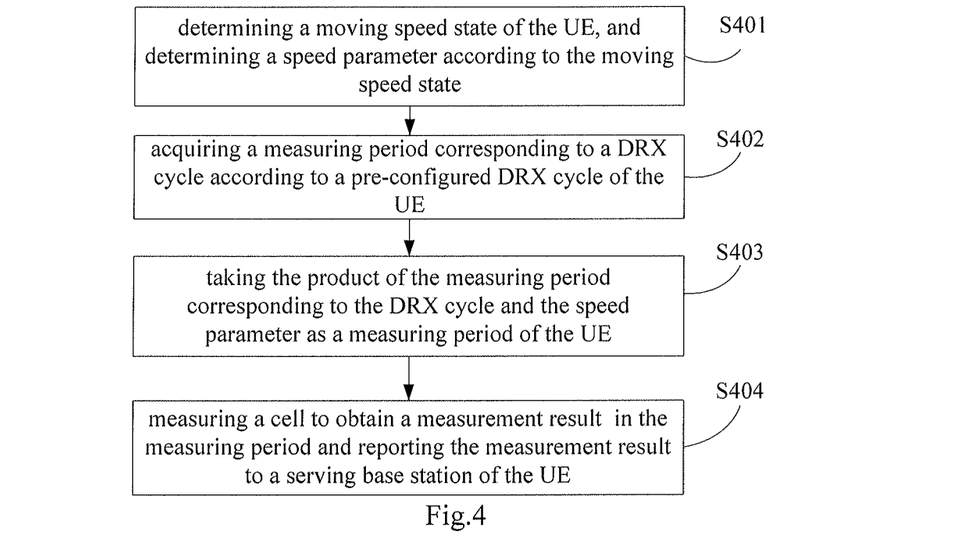
FIG. 4 is a flowchart of a method for UE to report a measurement result provided in embodiment 3 of the present disclosure.

An embodiment of the present disclosure provides a method for UE to report a measurement result. The method below is described by taking a UE of an LTE system as an example, wherein the measurement parameter is specifically a speed parameter. Specifically, as shown in FIG. 4, the method includes:

S401, determining a moving speed state of the UE, and determining a speed parameter according to the moving speed state.

The UE may determine the moving speed state of the UE according to the number of switched or residing cells within a period. For example, the UE may acquire its own moving speed state according to the number of switched cells within a period. When the UE moves in an urban environment, coverage of a cell is relatively small, and distribution of base stations is relatively dense. If the number of the switched cells of the UE every 10 minutes is not less than 5, the moving speed state of the UE is a high moving speed state. If the number of the switched cells of the UE every 10 minutes is not less than 3, the moving speed state of the UE is a medium moving speed state. If the number of the switched cells of the UE every 10 minutes is less than 3, the moving speed state of the UE is considered as a normal moving speed state. When the UE moves in a suburban environment, coverage of a cell is relatively large, and distribution of base stations is relatively sparse. If the number of switched cells of the UE every 10 minutes is 2, and the moving speed state of the UE is a high moving speed state. If the number of the switched cells of the UE every 10 minutes is 1, the moving speed state of the UE is a medium moving speed state. If the number of the switched cells of the UE every 10 minutes is not more than 1, the moving speed state of the UE is a normal moving speed state.

Certainly, the UE may determine its own moving speed state by adopting other methods, and then define a specific high moving speed state, medium moving speed state and normal moving speed state by adopting the corresponding method, which is not specifically limited in the present disclosure.

Correspondingly, if the moving speed state is the high moving speed state, the determined speed parameter is a high moving speed state speed parameter; if the moving speed state is the medium moving speed state, the determined speed parameter is a medium moving speed state speed parameter; and if the moving speed state is the normal moving speed state, the determined speed parameter is a normal moving speed state speed parameter.

Wherein, the speed parameter may be configured by a base station and then sent to the UE through a dedicated signaling and/or a system broadcast message, and certainly the period parameter may also be pre-configured in the UE. The specific process includes: the UE receives a speed parameter set sent from the base station or a speed parameter set is pre-configured in the UE, wherein the speed parameter set includes speed parameters of different moving speed states; and then the UE determines the speed parameter from the speed parameter set according to the moving speed state of the UE.

S402, acquiring a measurement period corresponding to a DRX cycle according to a pre-configured DRX cycle of the UE.

For measurements of intra-frequency, inter-frequency and inter-system, the measurement period corresponding to the DRX is acquired respectively according to the pre-configured DRX cycle of the UE. The step of acquiring the measurement period according to the DRX belongs to the prior art, which will not be repeatedly redundantly herein.

S403, taking the product of the measurement period corresponding to the DRX cycle and the speed parameter as a measurement period of the UE.

The product of the measurement period corresponding to the DRX cycle of the intra-frequency, the inter-frequency and the inter-system and the speed parameter is the measurement period of the intra-frequency, the inter-frequency and the inter-system of the UE. If the acquired intra-frequency measurement period is less than the preset intra-frequency minimal measurement period, the UE performs a measurement according to the intra-frequency minimal measurement period. If the acquired inter-frequency measurement period is less than the preset inter-frequency minimal measurement period, the UE performs a measurement according to the inter-frequency minimal measurement period. Correspondingly, if the acquired inter-system measurement period is less than the preset inter-system minimal measurement period, the UE performs a measurement according to the inter-system minimal measurement period.

S404, measuring a cell to obtain a measurement result in the measurement period and reporting the measurement result to a serving base station of the UE.

According to the acquired intra-frequency measurement period, inter-frequency measurement period and inter-system measurement period, in the corresponding measurement period, respectively, the UE measures the cell to obtain the measurement result and reports the corresponding measurement result to an RRC layer of the UE, and the RRC layer of the UE accurately and timely reports a measurement result satisfying a report criterion, to the base station.

The LTE system is taken as an example for illustration in this embodiment. Certainly, this method is also applicable for other communication systems, such as TDSCDM, CDMA and the like. However, the specific DRX cycles are configured to be different for different communication systems. The specific process will not be repeated redundantly herein.

According to the method for UE to report a measurement result provided in the embodiment of the present disclosure, the speed parameter corresponding to the moving speed state of the UE is preset, and the measurement period of the UE is acquired according to the speed parameter and the preset DRX cycle of the UE, so that the measurement result may be timely and accurately reported when the UE is in the high speed state, and the communication continuity of the UE is improved.

Embodiment 4

Figure 5:
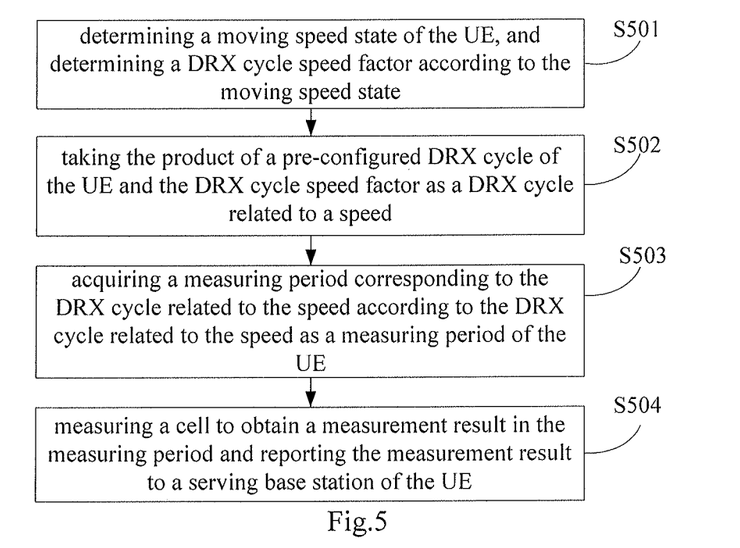
FIG. 5 is a flowchart of a method for UE to report a measurement result provided in embodiment 4 of the present disclosure.

The embodiment of the present disclosure provides a method for UE to report a measurement result. The method below is described by taking a UE of an LTE system as an example, wherein the measurement parameter is specifically a DRX cycle speed factor. Specifically, as shown in FIG. 5, the method includes:

S501, determining a moving speed state of the UE, and determining a DRX cycle speed factor according to the moving speed state.

The UE may determine the moving speed state of the UE according to the number of switched or residing cells within a period. For example, the UE may acquire its own moving speed state according to the number of switched cells within a period. When the UE moves in an urban environment, coverage of a cell is relatively small, and distribution of base stations is relatively dense. If the number of the switched cells of the UE every 10 minutes is not less than 5, and the moving speed state of the UE is a high moving speed state. If the number of the switched cells of the UE every 10 minutes is not less than 3, the moving speed state of the UE is a medium moving speed state. If the number of the switched cells of the UE every 10 minutes is less than 3, the moving speed state of the UE is considered as a normal moving speed state. When the UE moves in a suburban environment, coverage of a cell is relatively large, and distribution of base stations is relatively sparse. If the number of switched cells of the UE every 10 minutes is 2, and the moving speed state of the UE is a high moving speed state. If the number of the switched cells of the UE every 10 minutes is 1, the moving speed state of the UE is a medium moving speed state. If the number of the switched cells of the UE every 10 minutes is not more than 1, the moving speed state of the UE is a normal moving speed state.

Certainly, the UE may determine its own moving speed state by adopting other methods, and then define a specific high moving speed state, medium moving speed state and normal moving speed state by adopting the corresponding method, which is not specifically limited in the present disclosure.

Correspondingly, if the moving speed state is the high moving speed state, the determined DRX cycle speed factor is a high moving speed state DRX cycle speed factor; if the moving speed state is the medium moving speed state, the determined DRX cycle speed factor is a medium moving speed state DRX cycle speed factor; and if the moving speed state is the normal moving speed state, the determined DRX cycle speed factor is a normal moving speed state DRX cycle speed factor.

Wherein, the DRX cycle speed factor may be configured by a base station and then sent to the UE through a dedicated signaling and/or a system broadcast message, and certainly the DRX cycle speed factor may also be pre-configured in the UE. The specific process includes: the UE receives a DRX cycle speed factor parameter set sent from the base station or a DRX cycle speed factor parameter set is pre-configured in the UE, wherein the DRX cycle speed factor parameter set includes DRX cycle speed factors of different moving speed states; and then the UE determines the DRX cycle speed factor according to the moving speed state of the UE from the DRX cycle speed factor parameter set.

S502, taking the product of a pre-configured DRX cycle of the UE and the DRX cycle speed factor as a DRX cycle related to a speed.

S503, acquiring a measurement period corresponding to the DRX cycle related to the speed according to the DRX cycle related to the speed as a measurement period of the UE.

According to the DRX cycle related to the speed, the UE acquires measurement periods corresponding to the DRX cycles related to speed of the intra-frequency, the inter-frequency and the inter-system respectively. If the acquired intra-frequency measurement period is less than the preset intra-frequency minimal measurement period, the UE performs a measurement according to the intra-frequency minimal measurement period. If the acquired inter-frequency measurement period is less than the preset inter-frequency minimal measurement period, the UE performs a measurement according to the inter-frequency minimal measurement period. Correspondingly, if the acquired inter-system measurement period is less than the preset inter-system minimal measurement period, the UE performs a measurement according to the inter-system minimal measurement period.

S504, measuring a cell to obtain a measurement result in the measurement period and reporting the measurement result to a serving base station of the UE.

According to the acquired intra-frequency measurement period, inter-frequency measurement period and inter-system measurement period, in the corresponding measurement period, respectively, the UE measures the cell to obtain the measurement result and reports the corresponding measurement result to an RRC layer of the UE, and the RRC layer of the UE accurately and timely reports a measurement result satisfying a report criterion, to the base station.

The LTE system is taken as an example for illustration in this embodiment. Certainly, this method is also applicable for other communication systems, such as TDSCDM, CDMA and the like. However, the specific DRX cycles are configured to be different for different communication systems. The specific process will not be repeated redundantly herein.

According to the method for UE to report a measurement result provided in the embodiment of the present disclosure, the DRX cycle speed factor corresponding to the moving speed state of the UE is preset, and the measurement period of the UE is acquired according to the DRX cycle speed factor and the pre-configured DRX cycle of the UE without affecting the use of the DRX cycle by other modules in the UE, so that the measurement result may be timely and accurately reported when the UE is in the high speed state, and the communication continuity of the UE is improved.

Embodiment 5

Figure 6:
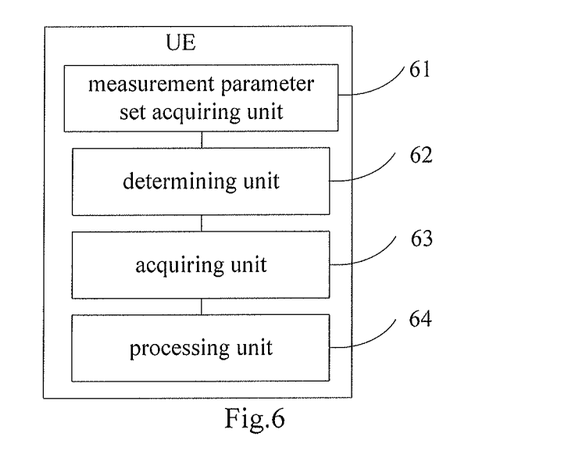
FIG. 6 is a composition block diagram of UE provided in embodiment 5 of the present disclosure.
Figure 7:
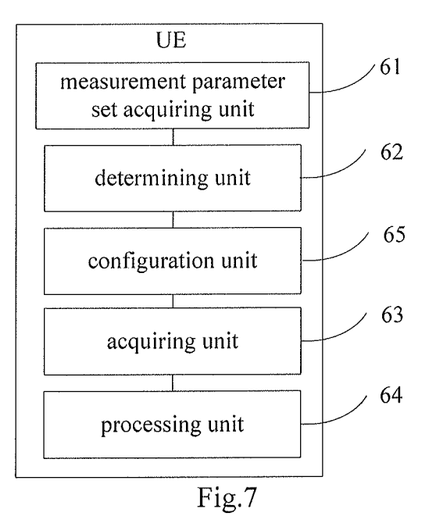
FIG. 7 is a composition block diagram of another UE provided in embodiment 5 of the present disclosure.

The embodiment of the present disclosure provides a UE. As shown in FIG. 6 and FIG. 7, the UE includes: a measurement parameter set acquiring unit 61, a determining unit 62, an acquiring unit 63 and a processing unit 64.

The measurement parameter set acquiring unit 61 is configured to receive a measurement parameter set sent from a base station; or is configured to pre-configure a measurement parameter set in the UE;

the measurement parameter set includes measurement parameters of different moving speed states.

The determining unit 62 is configured to determine a moving speed state of the UE and determine a measurement parameter from the measurement parameter set acquired by the measurement parameter set acquiring unit according to the moving speed state.

The determining unit 62 of the UE may determine the moving speed state of the UE according to the number of switched or residing cells within a period. For example, the determining unit 62 may acquire its own moving speed state according to the number of switched cells within a period. When the UE moves in an urban environment, coverage of a cell is relatively small, and distribution of base stations is relatively dense. If the number of the switched cells of the UE every 10 minutes is not less than 5, the moving speed state of the UE is a high moving speed state. If the number of the switched cells of the UE every 10 minutes is not less than 3, the moving speed state of the UE is considered as a medium moving speed state. If the number of the switched cells of the UE every 10 minutes is less than 3, the moving speed state of the UE is a normal moving speed state. When the UE moves in a suburban environment, coverage of a cell is relatively large, and distribution of base stations is relatively sparse. If the number of the switched cells of the UE every 10 minutes is 2, and the moving speed state of the UE is a high moving speed state. If the number of the switched cells of the UE every 10 minutes is 1, the moving speed state of the UE is a medium moving speed state. If the number of the switched cells of the UE every 10 minutes is not more than 1, the moving speed state of the UE is a normal moving speed state.

Certainly, the determining unit 62 of the UE may determine its own moving speed state by adopting other methods and then define a specific high moving speed state, medium moving speed state and normal moving speed state by adopting the corresponding method, which is not specifically limited in the present disclosure.

Correspondingly, if the moving speed state is the high moving speed state, the measurement parameter determined from the measurement parameter set by the determining unit 62 of the UE is a high moving speed state measurement parameter; if the moving speed state is the medium moving speed state, the measurement parameter determined from the measurement parameter set by the determining unit 62 of the UE is a medium moving speed state measurement parameter; and if the moving speed state is the normal moving speed state, the measurement parameter determined from the measurement parameter set by the determining unit 62 of the UE is a normal moving speed state measurement parameter.

In this embodiment, the UE may merely determine that the moving speed state of the UE is the high moving speed state or the normal moving speed state, and certainly the UE may also determine the high moving speed state, the medium moving speed state and the normal moving speed state.

The acquiring unit 63 is configured to acquire a measurement period of the UE according to the measurement parameter determined by the determining unit 62.

The processing unit 64 is configured to measure a cell to obtain a measurement result in the measurement period of the UE acquired by the acquiring unit 63 and report the measurement result to a serving base station of the UE.

In the measurement period, the processing unit 64 of the UE measures the cell to obtain the measurement result, and then a physical layer of the UE reports the measurement result to a high-level RRC layer of the UE. The high-level RRC layer of the UE accurately and timely reports a measurement result satisfying a report criterion to the base station, so that the base station determines whether the UE needs to perform cell switching and which cell the UE needs to be switched to according to the contents of the measurement result.

Certainly, when the UE measures the cell, the UE may measure a serving cell of the UE or simultaneously measure a serving cell and a neighboring cell of the UE.

Wherein, the measurement parameter specifically may be a period parameter, a speed parameter or a .DRX cycle speed factor.

If the measurement parameter is the speed parameter, the acquiring unit 63 is specifically configured to acquire a measurement period corresponding to a DRX cycle according to a pre-configured DRX cycle of the UE;

to take the product of the measurement period corresponding to the DRX cycle and the speed parameter as the measurement period of the UE.

The product of the measurement period corresponding to the DRX cycle of the intra-frequency, the inter-frequency and the inter-system and the speed parameter is the measurement period of the intra-frequency, the inter-frequency and the inter-system of the UE. If the acquired intra-frequency measurement period is less than the preset intra-frequency minimal measurement period, the UE performs a measurement according to the intra-frequency minimal measurement period. If the acquired inter-frequency measurement period is less than the preset inter-frequency minimal measurement period, the UE performs a measurement according to the inter-frequency minimal measurement period. Correspondingly, if the acquired inter-system measurement period is less than the preset inter-system minimal measurement period, the UE performs a measurement according to the inter-system minimal measurement period.

Further, the measurement parameter may also be the DRX cycle speed factor, and the acquiring unit is specifically configured to take the product of the pre-configured DRX cycle of the UE and the DRX cycle speed factor as a DRX cycle related to a speed;

to acquire a measurement period corresponding to the DRX cycle related to the speed according to the DRX cycle related to the speed as the measurement period of the UE.

According to the DRX cycle related to the speed, the UE acquires measurement periods corresponding to the DRX cycles related to speed of the intra-frequency, the inter-frequency and the inter-system respectively. If the acquired intra-frequency measurement period is less than the preset intra-frequency minimal measurement period, the UE performs a measurement according to the intra-frequency minimal measurement period. If the acquired inter-frequency measurement period is less than the preset inter-frequency minimal measurement period, the UE performs a measurement according to the inter-frequency minimal measurement period. Correspondingly, if the acquired inter-system measurement period is less than the preset inter-system minimal measurement period, the UE performs a measurement according to the inter-system minimal measurement period.

The LTE system is taken as an example for illustration in this embodiment. Certainly, this method is also applicable for other communication systems, such as TDSCDM, CDMA and the like. However, the specific DRX cycles are configured to be different for different communication systems. The specific process will not be repeated redundantly herein.

In addition, if the measurement parameter is the period parameter, as shown in FIG. 7, the UE also includes: a configuration unit 65.

The configuration unit 65 is configured to configure period parameter threshold of an intra-frequency measurement, an inter-frequency measurement and an inter-system measurement respectively.

The acquiring unit 63 is specifically configured to determine a calculation parameter according to the period parameter determined by the determining unit 62;

to determine whether the calculation parameter is greater than a preset period parameter threshold of the UE;

to acquire the measurement period of the UE according to the calculation parameter, if the calculation parameter is greater than the period parameter threshold;

to determine a preset minimal measurement period of the UE as the measurement period of the UE, if the calculation parameter is less than the period parameter threshold.

Wherein, the acquiring unit 63 determines the calculation parameter according to the period parameter determined by the determining unit 62, specifically including: the period parameter is determined as the calculation parameter; or the lower value of the period parameter and the pre-configured DRX cycle of the UE is acquired and the lower value is determined as the calculation parameter.

Certainly, for the intra-frequency, the inter-frequency and the inter-system, the acquiring unit 63 needs to acquire an intra-frequency measurement period, an inter-frequency measurement period and an inter-system measurement period respectively.

For acquiring the intra-frequency measurement period, specifically, a threshold of an intra-frequency measurement period parameter configured by the configuration unit 65 may be 0.04 s. If the calculation parameter is greater than the threshold of the intra-frequency measurement period parameter, the acquiring unit 63 is configured to acquire the product of a first natural number N1 and the calculation parameter as the intra-frequency measurement period of the UE, wherein the N1 is a preset natural number sent from a base station to the UE according to the high moving speed state through a dedicated signaling and/or a system broadcast message, and certainly the N1 may also be pre-configured in the UE, specifically as shown in table 1.

For the inter-frequency measurement period, specifically, a threshold of an inter-frequency period parameter configured by the configuration unit 65 may be 0.08 s. If the calculation parameter is greater than the threshold of the inter-frequency measurement period parameter, the acquiring unit 63 is configured to acquire the product of a second natural number N2, the number of inter-frequency layers $N_{freq}$ and the calculation parameter as the inter-frequency measurement period of the UE, wherein the N2 is a natural number preset by the base station according to different moving speed states and then sent to the UE through a dedicated signaling and/or a system broadcast message, and certainly the N2 may also be pre-configured in the UE; and the $N_{freq}$ is the number of the inter-frequency layers which need to be measured and are acquired by the UE through a system broadcast message and/or a dedicated signaling received from the base station, and the number of the inter-frequency layers $N_{freq}$ is the sum of the number of the frequency layers of the inter-frequency of the common-system and the number of the inter-system frequency layers of the UE. For this embodiment, the number of the inter-frequency layers indicates the sum of the number of the frequency layers of the inter-frequency of the LTE system and the number of the frequency layers of the non-LTE system, specifically as shown in table 2.

For the inter-system measurement period, a threshold of the inter-system measurement period configured by the configuration unit 65 may be 0.128 s. If the calculation parameter is greater than the inter-system measurement period threshold, the acquiring unit 63 is configured to acquire the product of a third natural number N3, the number of inter-frequency layers $N_{freq}$ and the calculation parameter as the inter-system measurement period of the UE, wherein the N3 is a natural number preset by the base station according to different moving speed states and then sent to the UE through a dedicated signaling and/or a system broadcast message, and certainly the N3 may also be pre-configured in the UE; and the $N_{freq}$ is the number of the inter-frequency layers which need to be measured and are acquired by the UE through a system broadcast message and/or a dedicated signaling received from the base station. The number of the inter-frequency layers $N_{freq}$ is the sum of the number of the frequency layers of the inter-frequency of the common-system and the number of the inter-system frequency layers of the UE. For this embodiment, the number of the inter-frequency layers may indicate the sum of the number of the frequency layers of the inter-frequency of the LTE system and the number of the frequency layers of the non-LTE system. For the UE using the LTE system, when an interval that the UE receives inter-system information, which is configured by the base station, is 40 ms or 80 ms, the measurement periods of the inter-system corresponding to different calculation parameters corresponds to different values.

If the calculation parameter is less than the inter-frequency measurement period parameter threshold, the acquiring unit 63 is configured to determine the preset minimal measurement period as the measurement period of the UE. Correspondingly, as mentioned in table 1, table 2 and table 3, if the calculation parameter is not greater than the threshold of the intra-frequency measurement period, the intra-frequency measurement period is the preset intra-frequency minimal measurement period of the system, and specifically may be 200 ms; the inter-frequency cell measurement period is the preset inter-frequency minimal measurement period of the system, and specifically may be the product of 0.48 and the number $N_{freq}$ of the inter-frequency layers or the product of 0.24 and the number $N_{freq}$ of the inter-frequency layers; and the inter-system measurement period is determined according to the preset value of the system, for example, when the calculation parameter is not more than 0.04, if the measurement interval is not needed, the inter-system measurement period is 0.48 s, if the measurement interval is needed, the inter-system measurement period is the minimal measurement period of the inter-system. Specifically, for example, when a UTRAN (UMTS Terrestrial Radio Access Network, UMTS terrestrial radio access network) frequency point is measured and the measurement interval is not needed, the inter-system measurement period is 0.48 s; when the measurement interval is used, the inter-system measurement period is $$T_{measurement\_UTRA\_FDD} = \text{Max}\left\{T_{Measurement\_Peruod\_UTRA\_FDD}, T_{basic\_measurement\_UTRA\_FDD} * \frac{480}{T_{interI}} * N_{Freq}\right\} \text{ms},$$

wherein, $T_{Measurement\_Peruod\_UTRA\_FDD}$ is the inter-system minimal measurement period 0.48 s when the measurement interval is not needed, $T_{basic\_measurement\_UTRA\_FDD}$ is the longest time for the UE to identify one UTRAN cell, and $T_{Inter1}$ is the least time for measuring the inter-frequency or the inter-system within the period of 0.48 s, the inter-frequency layers $N_{Freq}$ is the sum of the number of the inter-frequency frequency layers of the UE and the number of the frequency layers of the inter-system of the UE.

According to the UE provided in the embodiment of the present disclosure, the measurement parameter corresponding to the moving speed state of the UE is preset, the acquiring unit acquires the measurement period of the UE, and specifically, the measurement period of the UE may be acquired according to the period parameter, the speed parameter or the DRX cycle speed factor, so that the period that the UE reports the measurement result is related to the moving speed of the UE, the measurement result may be timely and accurately reported when the UE is in the high speed state, and the communication continuity of the UE is improved.

It should be appreciated by those of ordinary skill in the art that all or a part of the steps in the embodiments of the aforementioned method may be implemented with a program instructing related hardware. The program may be stored in a computer readable storage medium. When the program is executed, the steps included in the embodiments of the aforementioned method are executed. The storage medium includes various media capable of storing program codes, such as read-only memory (ROM), random access memory (RAM), magnetic disk, optical disk or the like.

The foregoing descriptions are merely specific embodiments of the present disclosure, rather than limiting the protection scope of the present disclosure. Any skilled one who is familiar with this art could readily think of variations or substitutions within the disclosed scope of the present disclosure, and these variations or substitutions shall fall within the protection scope of the present disclosure. Accordingly, the protection scope of the claims should prevail over the protection scope of the present disclosure.

What is claimed is:

1. A method for reporting a measurement result, comprising:
    determining, by a user equipment (UE) comprising a processor, a moving speed state of the UE, and determining a measurement parameter according to the moving speed state, wherein the measurement parameter is a period parameter;
    determining, by the UE, a calculation parameter according to the determined period parameter;
    determining, by the UE, whether the calculation parameter is greater than a preset period parameter threshold of the UE;
    acquiring, by the UE, the measurement period of the UE according to the calculation parameter, if the calculation parameter is greater than the period parameter threshold;
    determining, by the UE a preset minimal measurement period of the UE as the measurement period of the UE, if the calculation parameter is less than the period parameter threshold; and
    measuring, by the UE, a cell to obtain a measurement result in the measurement period and reporting the measurement result to a serving base station of the UE.

2. The method according to claim 1, wherein the determining a calculation parameter according to the determined period parameter comprises:
    determining the period parameter as the calculation parameter; or
    acquiring the lower value of the period parameter and a pre-configured discontinuous reception (DRX) cycle of the UE, and determining the lower value as the calculation parameter.

3. The method according to claim 1, wherein the measuring a cell comprises: an intra-frequency measurement, an inter-frequency measurement and an inter-system measurement;
    before determining a moving speed state of the UE, and determining the measurement parameter according to the moving speed state, the method further comprises:
    configuring period parameter threshold of the intra-frequency measurement, the inter-frequency measurement and the inter-system measurement respectively;
    acquiring the measurement period of the UE according to the calculation parameter, if the calculation parameter is greater than the period parameter threshold, comprises:
    acquiring the product of a first natural number and the calculation parameter as an intra-frequency measurement period;
    acquiring the product of a second natural number, the calculation parameter and number of inter-frequency layers as an inter-frequency measurement period; and
    acquiring the product of a third natural number, the calculation parameter and the number of the inter-frequency layers as an inter-system measurement period;
    wherein the first natural number, the second natural number and the third natural number are preset by a base station according to the moving speed state respectively.

4. A user equipment (UE) comprising a processor and a non-transitory storage accessible to the processor, the non-transitory storage comprising:
    a determining unit, configured to determine a moving speed state of the UE, and to determine a measurement parameter according to the moving speed state, wherein the measurement is a period parameter;
    an acquiring unit, configured to determine a calculation parameter according to the period parameter determined by the determining unit, determine whether the calculation parameter is greater than a preset period parameter threshold of the UE, acquire the measurement period of the UE according to the calculation parameter, if the calculation parameter is greater than the period parameter threshold and determine a preset minimal measurement period of the UE as the measurement period of the UE, if the calculation parameter is less than the period parameter threshold; and
    a processing unit, configured to measure a cell to obtain a measurement result in the measurement period of the UE acquired by the acquiring unit, and to report the measurement result to a serving base station of the UE.

5. The UE according to claim 4, wherein the acquiring unit determines the calculation parameter according to the period parameter determined by the determining unit, comprising:
    determining the period parameter as the calculation parameter; or
    acquiring the lower value of the period parameter and the pre-configured discontinuous reception (DRX) cycle of the UE, and determining the lower value as the calculation parameter.

6. The UE according to claim 4, wherein a measurement of the cell performed by the processing unit comprises an intra-frequency measurement, an inter-frequency measurement and an inter-system measurement;
    the UE further comprises a configuring unit, configured to configure period parameter threshold of the intra-frequency measurement, the inter-frequency measurement and the inter-system measurement respectively;
    wherein the acquiring unit is configured to:
    acquire the product of a first natural number and the calculation parameter as an intra-frequency measurement period;

acquire the product of a second natural number, the calculation parameter and the number of inter-frequency layers as an inter-frequency measurement period; and acquire the product of a third natural number, the calculation parameter and the number of the inter-frequency layers as an inter-system measurement period;

wherein the first natural number, the second natural number and the third natural number are preset by a base station according to the moving speed state respectively.

7. The UE according to claim 4, wherein the measurement parameter is a speed parameter; and wherein the acquiring unit is configured to:

acquire a measurement period corresponding to a DRX cycle according to the pre-configured DRX cycle of the UE; and take the product of the measurement period corresponding to the DRX cycle and the speed parameter as the measurement period of the UE.

8. A method for reporting a measurement result, comprising:

determining, by a user equipment (UE) comprising a processor, a moving speed state of the UE, and determining a measurement parameter according to the moving speed state, wherein the measurement parameter is a speed parameter;

acquiring, by the UE, a measurement period corresponding to a DRX cycle according to a pre-configured DRX cycle of the UE; and taking, by the UE, the product of the measurement period corresponding to the DRX cycle and the speed parameter as the measurement period of the UE; and measuring, by the UE, a cell to obtain a measurement result in the measurement period and reporting the measurement result to a serving base station of the UE.

9. A method for reporting a measurement result, comprising:

determining, by a user equipment (UE) comprising a processor, a moving speed state of the UE, and determining a measurement parameter according to the moving speed state, wherein the measurement parameter is a DRX cycle speed factor;

taking, by the UE, the product of a pre-configured discontinuous reception (DRX) cycle of the UE and the DRX cycle speed factor as a DRX cycle related to a speed; and acquiring, by the UE, a measurement period corresponding to the DRX cycle related to the speed according to the DRX cycle related to the speed as the measurement period of the UE; and measuring, by the UE, a cell to obtain a measurement result in the measurement period and reporting the measurement result to a serving base station of the UE.

10. A user equipment (UE) comprising a processor and a non-transitory storage accessible to the processor, the non-transitory storage comprising:

a determining unit, configured to determine a moving speed state of the UE, and to determine a measurement parameter according to the moving speed state, wherein the measurement parameter is a speed parameter;

an acquiring unit, configured to acquire a measurement period corresponding to a DRX cycle according to the pre-configured DRX cycle of the UE and take the product of the measurement period corresponding to the DRX cycle and the speed parameter as the measurement period of the UE; and a processing unit, configured to measure a cell to obtain a measurement result in the measurement period of the UE acquired by the acquiring unit, and to report the measurement result to a serving base station of the UE.

11. A user equipment (UE) comprising a processor and a non-transitory storage accessible to the processor, the non-transitory storage comprising:

a determining unit, configured to determine a moving speed state of the UE, and to determine a measurement parameter according to the moving speed state, wherein the measurement parameter is a discontinuous reception (DRX) cycle speed factor;

an acquiring unit, configured to take the product of the pre-configured DRX cycle of the UE and the DRX cycle speed factor as a DRX cycle related to a speed and acquire a measurement period corresponding to the DRX cycle related to the speed according to the DRX cycle related to the speed as the measurement period of the UE; and a processing unit, configured to measure a cell to obtain a measurement result in the measurement period of the UE acquired by the acquiring unit, and to report the measurement result to a serving base station of the UE.

* * * * *